Figure 1:
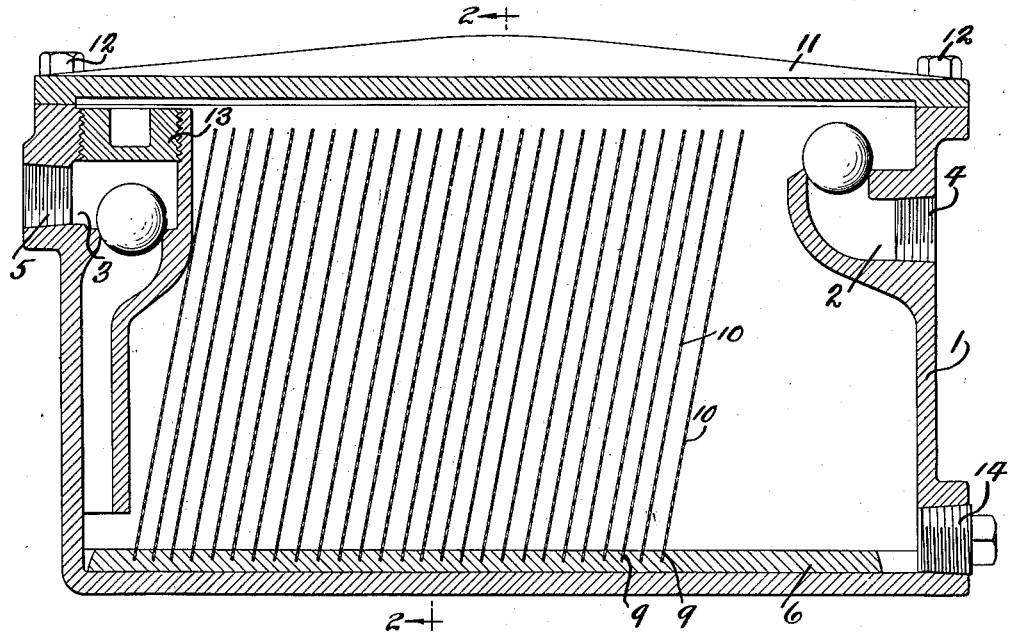

Nov. 29, 1932.   R. S. WHALEY   1,889,325
STRAINER
Filed July 9, 1930

INVENTOR.
Ralph S. Whaley.
BY
Kiddle, Margeson and Horridge.
ATTORNEYS.

Patented Nov. 29, 1932

1,889,325

UNITED STATES PATENT OFFICE

RALPH S. WHALEY, OF SEATTLE, WASHINGTON, ASSIGNOR TO PETROLEUM HEAT AND POWER COMPANY, OF NEW YORK, N. Y., A CORPORATION OF DELAWARE

STRAINER

Application filed July 9, 1930. Serial No. 466,651.

This invention relates to an improvement in strainer apparatus adapted to be inserted in an oil line, for example in the line of oil burning apparatus, and has for one of its objects the provision of a construction in which clogging or blocking of the strainer is avoided, and the oil or other liquid is subjected to a plurality of straining or screening operations before it finally discharges from the apparatus.

A further object of my invention is the provision of a strainer or screening apparatus so constructed and arranged that cleaning of the strainer is greatly facilitated.

The apparatus of this invention is capable of many uses and as above pointed out is particularly well adapted for use in connection with oil burning apparatus.

Figure 2:
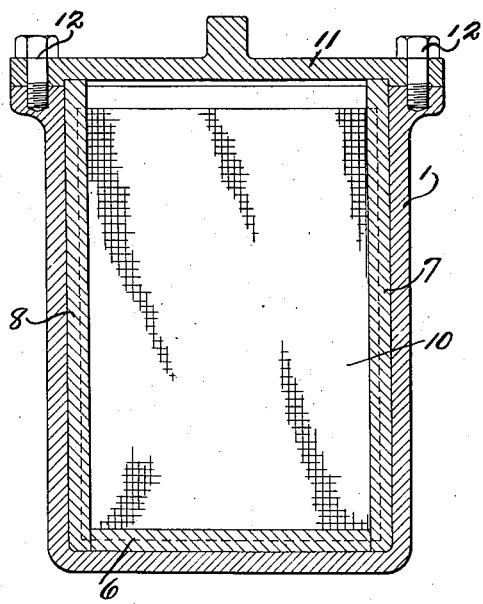

Referring to the drawing:

Fig. 1 is a sectional side elevational view of an embodiment of my invention; and Fig. 2 is a section on the line 2—2 of Fig. 1.

Referring to the drawing in detail, 1 designates a housing, which may be of any convenient shape, and provided with check valve controlled intake orifice 2 and check valve controlled discharge orifice 3. Connections into the line through which the material to be screened is passed may be made at 4 and 5.

Extending along the bottom of the housing is a liner plate 6 and along the inside of the sides of the housing are side liner plates 7 and 8. The liner plates 6, 7 and 8 are slotted at regular intervals as shown at 9 in Fig. 1, for instance, these slots being inclined at a slight angle to the horizontal.

Each of the slots 9 receives a screen or strainer designated 10. Each screen or strainer extends completely across the housing 1 but terminates short of the top thereof so as to provide a space between the tops of the screens and the cover 11 of the housing. This cover is removably attached to the housing by bolts 12.

Just above the check valve which controls the discharge of material from the housing through the discharge port 3 I provide a threaded plug 13 which when removed permits of access to the discharge check valve. At the bottom of the tank 1 I provide a cleanout plug 14.

The screens or screen plates are independently removable from their respective slots so that should any plate become clogged it can be removed and cleaned or replaced with another without disturbing the others.

An important feature of my construction is the fact that the material passing through the housing 1 is screened many times before it is finally discharged, being obliged to pass through all of the screens in its passage through the housing.

It will be appreciated that should any of the screens become plugged or blocked due to sediment collecting on the same the oil or other material can pass over the top of that plate and then downwardly through the other screens, due to the fact that the screens terminate short of the top of the housing.

It is to be understood that changes may be made in the details of construction above described within the spirit and scope of my invention.

What I claim is:—

1. Screening apparatus comprising in combination a housing, slotted screen holding plates along the bottom and sides of the housing, and a screen in each of the slots in said plates, said screens being independently removable.

2. Screening apparatus comprising a combination a housing provided with an intake port and a discharge port, a check valve for each port, a cover for the housing, a removable plug over the discharge valve, a series of screen plates within said housing, disposed in spaced parallel relation and removable independently through the top of the housing, said plates being inclined toward the intake port.

3. Screening apparatus comprising in combination a housing, a removable cover therefor, screen holding plates along the bottom and sides of said housing, said plates having inclined slots formed therein, screens in said slots, said screens being independently removable through the top of said housing.

4. Screening apparatus comprising in combination a housing, a removable cover therefor, liner plates along the bottom and sides of said housing, said plates being slotted at regular intervals, said slots being inclined at a slight angle to the horizontal, a screen in each of said slots and extending across the housing and terminating short of the top thereof, said screens being removable independent of each other.

This specification signed this 1st day of July, 1930.

RALPH S. WHALEY.